H. A. OWEN.
FEELER MOTION FOR LOOMS.
APPLICATION FILED JAN. 3, 1916.

1,278,732.

Patented Sept. 10, 1918.
5 SHEETS—SHEET 1.

Witness:
Oscar F. Hill

Inventor:
Henry A. Owen

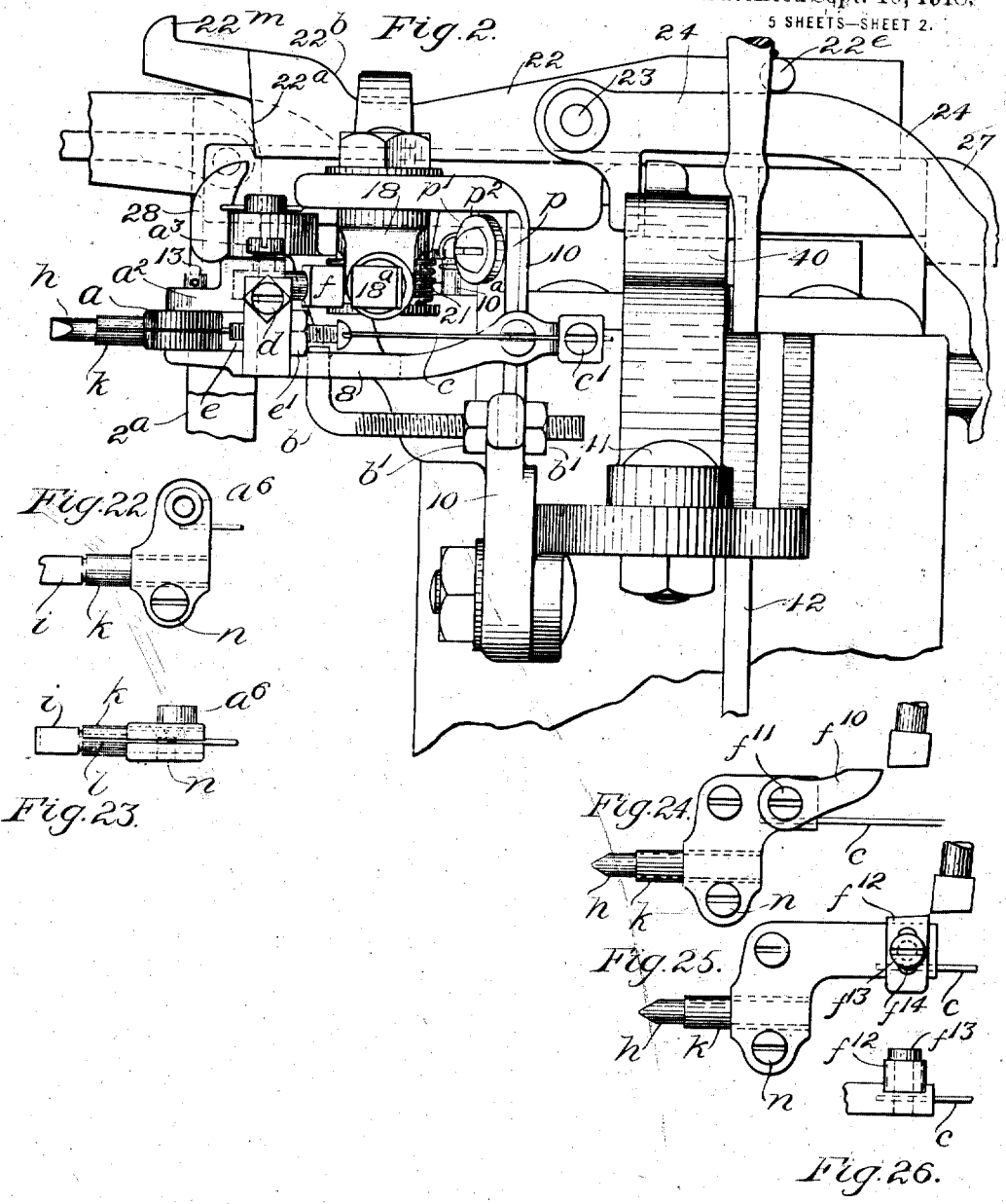

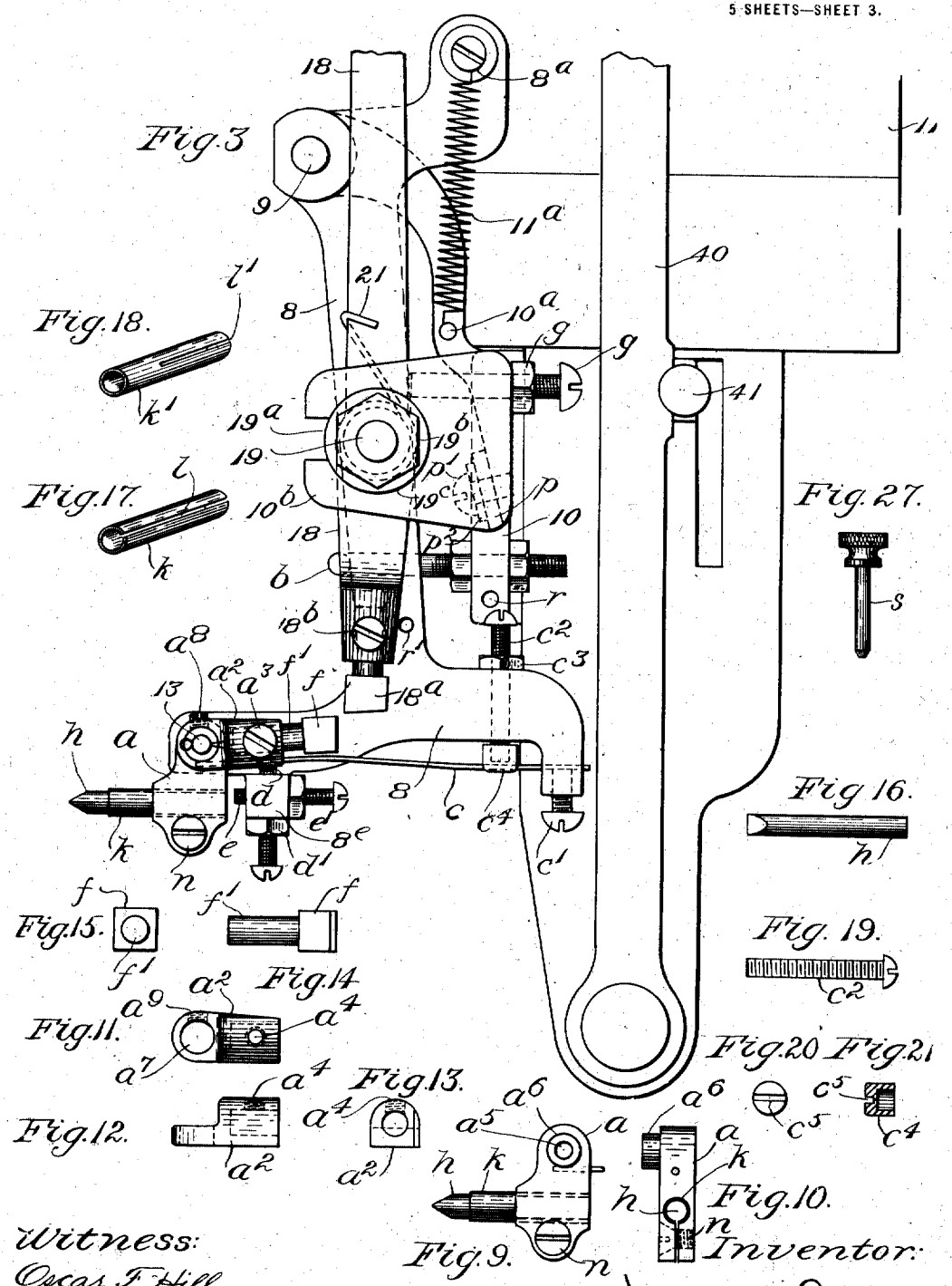

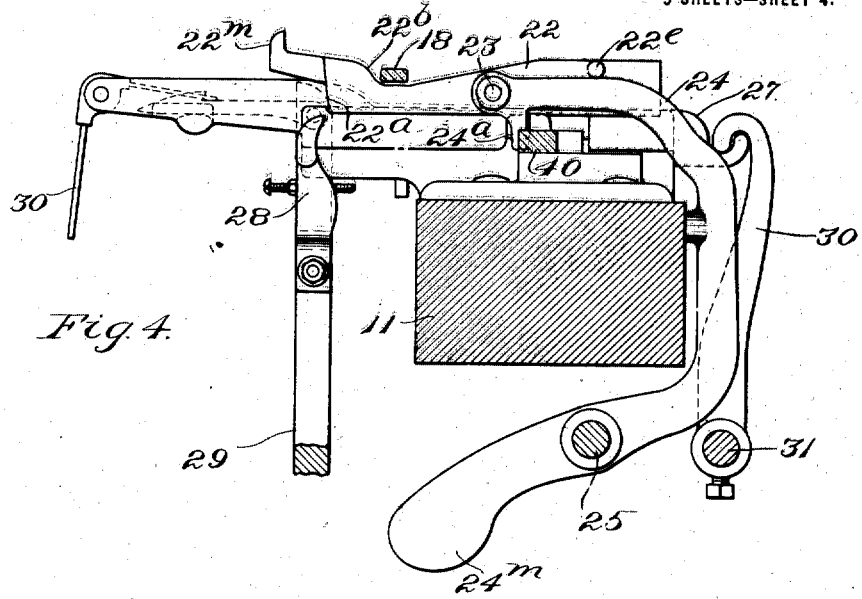
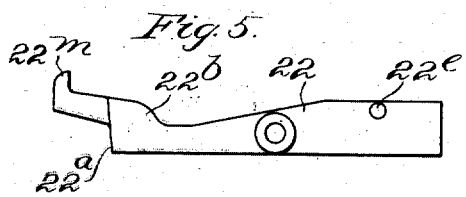 
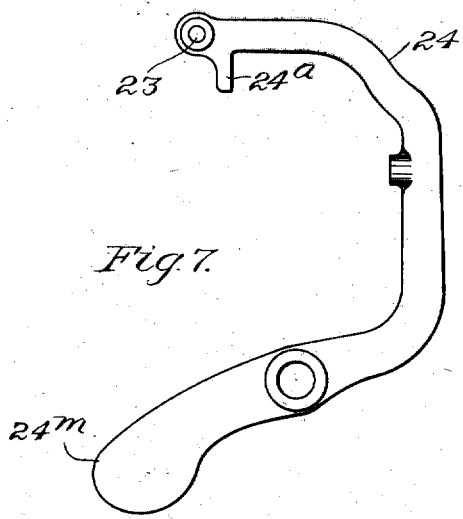 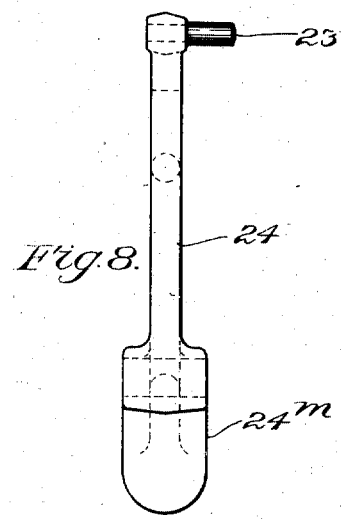

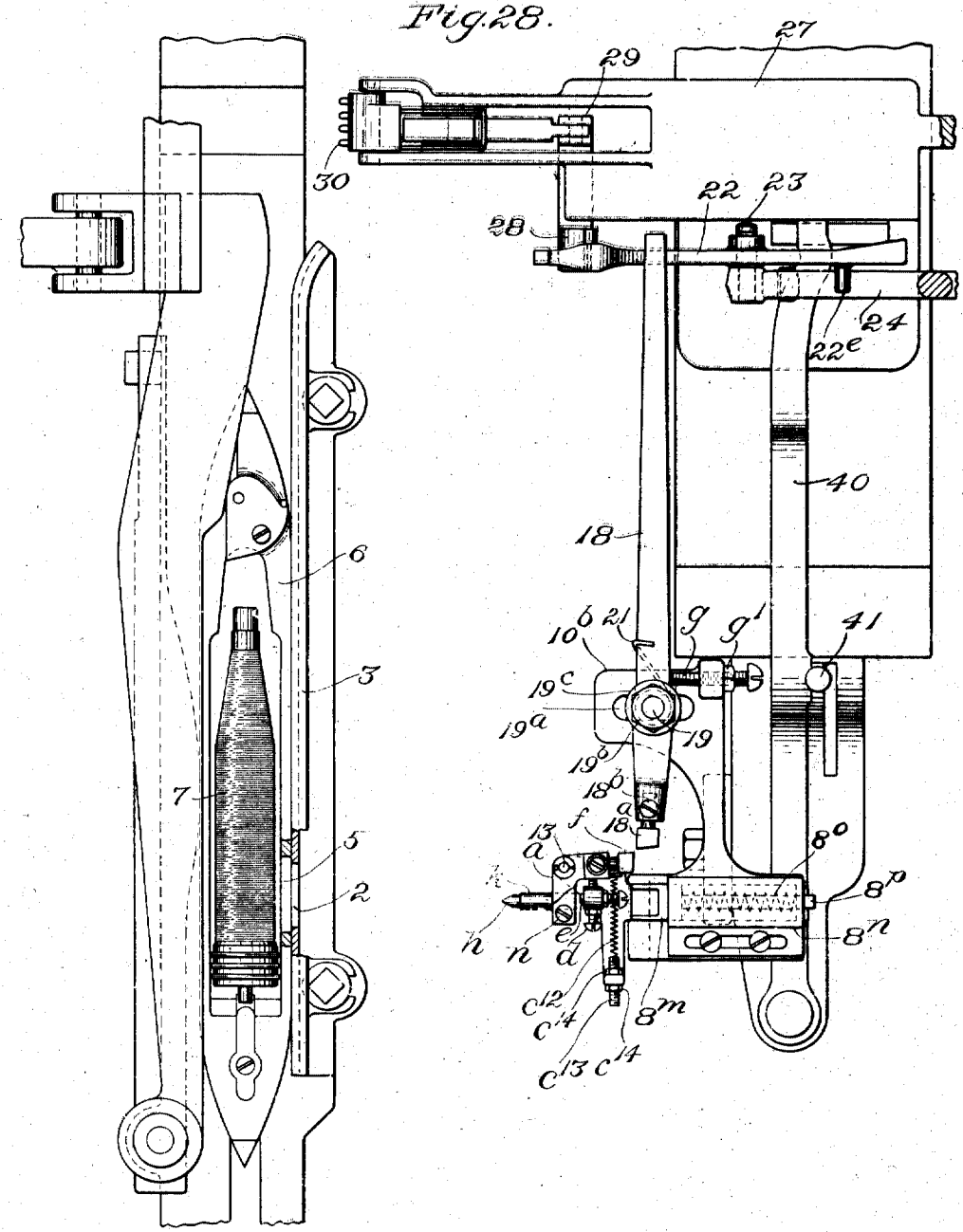

UNITED STATES PATENT OFFICE.

HENRY A. OWEN, OF WHITINSVILLE, MASSACHUSETTS, ASSIGNOR, BY MESNE ASSIGN-MENTS, TO DRAPER CORPORATION, OF HOPEDALE, MASSACHUSETTS, A CORPORATION OF MAINE.

FEELER-MOTION FOR LOOMS.

1,278,732.   Specification of Letters Patent.   Patented Sept. 10, 1918.

Application filed January 3, 1916.   Serial No. 69,742.

*To all whom it may concern:*

Be it known that I, HENRY A. OWEN, a citizen of the United States, residing at Whitinsville, in the county of Worcester, State of Massachusetts, have invented a certain new and useful Improvement in Feeler-Motions for Looms, of which the following is a specification, reference being had therein to the accompanying drawings.

The invention has relation to feeler-motions such as are employed in looms for detecting when the supply of weft or filling contained in a shuttle on the lay of a loom has become exhausted to a predetermined extent.

The invention comprises improvements in the feeler-tip or contact-point of a feeler-motion. It comprises, also, a brace or reinforce for the said feeler-tip or contact-portion. It comprises further, improvements in the feeler-member, proper, and in the actuator by which movement is transmitted for indicating purposes; in the means for defining the normal position of the feeler-member, and in the means for defining the engaging position of the actuator; in the tension means for the feeler-member; and in the portion of the controller which is engaged by the actuator for the actuation of the controller by the actuator and also in certain other features hereinafter described.

The drawings show illustrative embodiments of the various improvements which are comprised in the invention.

In the drawings,—

Fig. 2 is a side elevation on a larger scale of the feeler devices, the supporting means therefor, and the parts that are more immediately associated with the feeler devices.

Fig. 3 is a plan view of the feeler devices on the same scale as Fig. 2.

Fig. 4 is a view partly in section in a vertical plane near the feeler-controlled dog of the indicating devices.

Fig. 5 is a view showing the said dog attached, in side elevation, and Fig. 6 is an end view thereof.

Figs. 7 and 8 are views of the supporting arm for the said dog.

Figure 1:
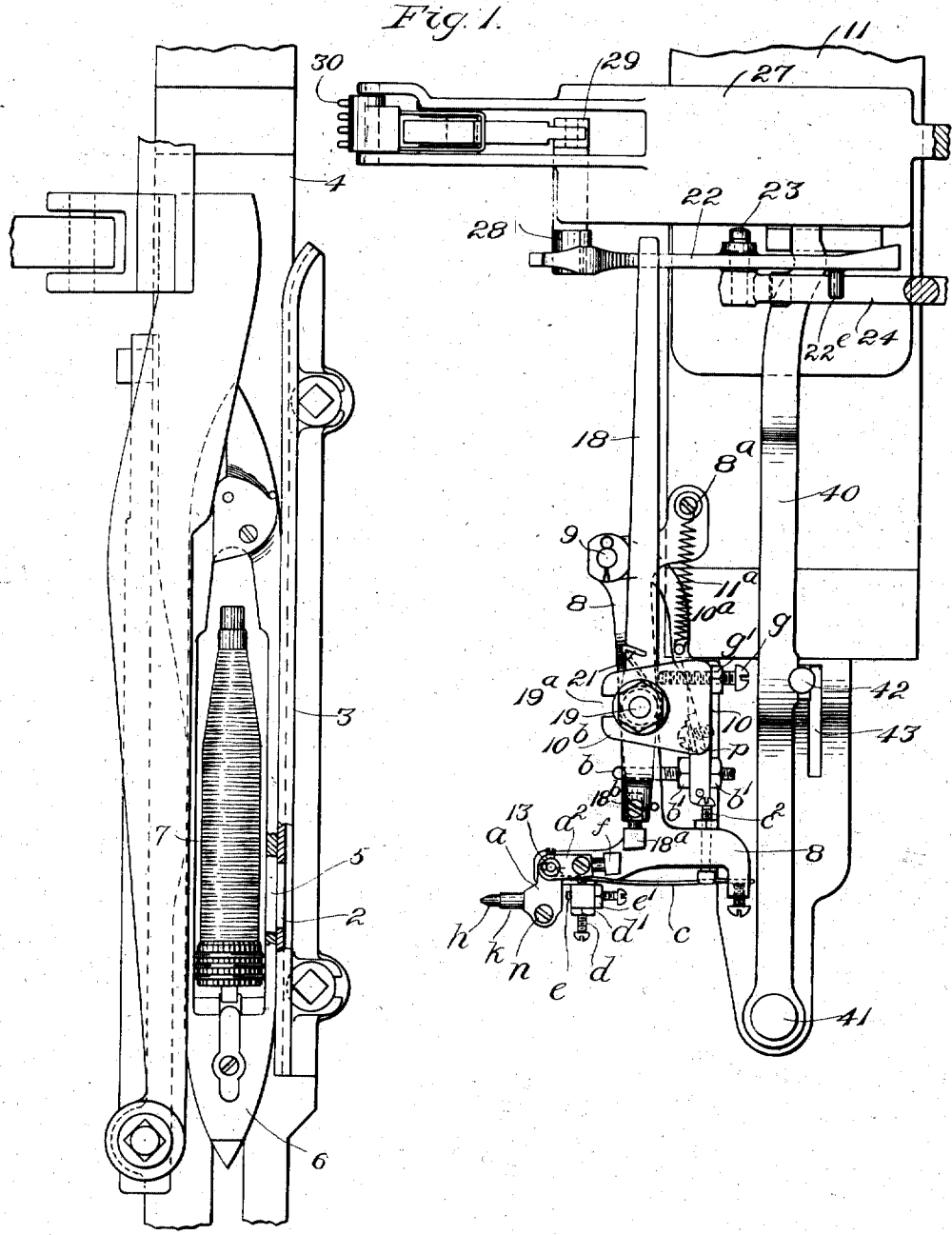
Figure 1 is a plan view of portions of a loom with certain of said illustrative embodiments applied thereto.

Figs 9 to 21, Sheet 3, are views of details, including the feeler-tip, its supporting means, its reinforce, and the tension-regulating means employed in connection with the feeler-tip.

Figs. 22 to 26, Sheet 2, are views showing modified forms of feeler-tips, and actuators.

Fig. 27, Sheet 3, shows separately a pin for locking the feeler-carrier forward.

Fig. 28, Sheet 5, is a view similar to Fig. 1, showing a feeler mounted to slide instead of swing.

Having reference to the drawings,—

The drawings show the various improvements embodied in two forms of feeler motions, both containing the general principles of that shown, described and claimed in U. S. Letters Patent No. 1,127,086, granted Feb. 2, 1915, upon my application therefor. At $a$ is the body of the feeler-member. The feeler-member, as usual, is supported in a position to place its tip, contact-point, or feeling-end, in line with an opening or slot 2 in the front-plate 3 of one of the shuttle-boxes of the lay 4, so that the said tip, contact-point, or feeling-end may project through a registering slot 5 in the front wall of a shuttle 6 that has passed home into the said shuttle-box. Thereby the necessary provision is made for the pressure of the exterior of the wound mass 7 of weft or filling contained in the said shuttle against the acting portion of the said tip, contact-point, or feeling-end as the lay beats up. In the first form of embodiment shown in the drawings, the carrier 8 upon which the feeler-member $a$ is mounted is constituted by a horizontal arm or lever, and is pivoted at 9 upon a rearwardly curved arm at the inner end of a supporting bracket 10 that is fixedly secured to the loom-frame at one end of the breast-beam 11. A contracting spiral spring $11^a$, having one end thereof engaged, as at $8^a$, Figs. 1 and 3, with a projection from the carrier 8, and the other end thereof engaged, as at $10^a$, with the said curved arm of the supporting bracket 10, acts to hold the carrier with yielding force normally in a rearward position, such position being defined by a stop $b$. In the said normal position, the tip, contact point, or feeling-end of the feeler is presented in position to be encountered by the said wound mass as the lay advances. The carrier is, as heretofore, movable from rear to front and vice versa in the loom, and is adapted to be driven forward in the loom by the forwardly acting push of the said wound mass against the tip, contact-point, or feeling-end, and to be returned rearward again to its position determined by the stop $b$ through the action of the spring 11$^a$. To enable the normal position of the engaging extremity of the feeler-member $a$ to be shifted rearward or forward so that the contents of the shuttle may encounter such extremity earlier or later in the advance of the lay, as may be desired, the stop $b$ is made adjustable so that its acting portion may be set backward or forward, as required. This constitutes one feature of the invention. In the present instance, the forwardly extending stem of the stop $b$ is screw-threaded and passes through a hole in a vertical portion of stand 10. The said screw-threaded stem has nuts $b'$, $b'$, thereon at opposite sides of the said portion of the stand. The said nuts provide for the adjustment.

As in the case of the feeler-member of the patent aforesaid, the feeler-member $a$ of the said first form of embodiment is mounted upon a rearward extension of the outer extremity of the carrier-arm or lever 8 so as to cause the tip or contact-point to travel in an outwardly convex arc of comparatively slight curvature. In a second form of embodiment which presently will be described, the feeler-carrier is mounted to move in a straight line. As in the patent aforesaid, lateral displacement of the feeler-member lengthwise of the shuttle by the contact pressure when the supply of weft or filling contained within the shuttle is exhausted to a predetermined extent is provided for in both of the forms of embodiment shown herein by mounting the feeler-member upon a vertical pivot 13 in connection with the feeler-carrier 8 so that the feeler-member may swing transversely in a horizontal plane relative to the feeler-carrier, and lengthwise of the filling-carrier within the shuttle. Also, the extremity of its tip or contact-point is offset laterally with respect to the pivot 13 so that the forwardly directed push of filling-mass may take effect upon the said extremity at one side of the said pivot, with a tendency to swing the feeler-member around the pivot. As in the patent, also, a spring is employed for the purpose of keeping the feeler-member yieldingly in its normal position upon the feeler-carrier, and returning it to such position after displacement therefrom. The first form of embodiment contains a spring $c$ forming a part of the present invention and employed for such purpose. The said spring acts with a tendency to keep the forwardly-extending branch or arm $a^2$ of the feeler-member against a stop $d$ carried by the feeler-carrier 8, such stop serving to define the normal position of the feeler-member upon the feeler-carrier. The extent of the movement of angular lateral displacement of the feeler-member relative to the feeler-carrier 8 is defined by a second stop $e$, mounted upon the feeler-carrier in position to engage with the body-portion of the feeler-member. Certain features of the present invention are embodied in connection with these two stops, as presently will be made to appear. As in the patent, further, an actuator forming a part of the feeler-member, or carried thereby, coacts with a controller 18 when the lateral displacement of the feeler-member takes place, so as to actuate the said controller during the forward stroke of the feeler-member and feeler-carrier, and thereby indicate for the required change in the working of the loom. I have shown at $f$, Figs. 1, 2, 3, an actuator embodying features of the present invention. The controller 18 is a lever, as in the patent, and is mounted upon a vertical pivot 19 carried by an overhanging rearwardly extending portion 10$^b$ of the supporting stand. The pivot 19 is adjustable in the direction from front to rear in a slot 19$^a$ in the said overhanging portion, it being made fast in adjusted position by means of a nut 19$^b$ and washer 19$^c$. A spring 21 engaging with the said controller operates to hold it normally in the position occupied by it in Fig. 1, namely with its outer end rearward. This position is defined by the adjustable stop $g$ constituting a feature of the present invention. The said adjustable stop is, in the illustrated embodiments of the invention, a screw fitted to a threaded hole that is tapped in an upstanding portion of the supporting stand, with its rear end in position to be encountered by controller 18 as the latter swings under the action of the spring 21. A check-nut $g'$ applied to the threaded stem of the said screw serves to prevent accidental loss of adjustment. The devices shown in the drawings through which the controller operates to call the required change in the working of the loom are somewhat similar to those shown in the patent aforesaid. They comprise, essentially the dog 22, (shown separately in Figs. 5 and 6,) pivoted at 23 upon a carrying arm 24, (shown separately in Figs. 7 and 8,) which, as shown best in Fig. 4, is mounted upon a supporting shaft 25 under the breast-beam 11. The said arm extends forward and upward in front of the breast-beam, against the front surface of which it rests normally, and that portion of the arm carrying the pivot 23 projects rearward above the breast-beam, alongside the weft-fork slide 27. The shoulder 22$^a$ at the rear end of the dog 22 is adapted to be engaged by a striker 28 carried by the weft-hammer 29. The usual weft-fork 30 is mounted pivotally upon the rear end of the weft-fork slide 27.

I have shown herein feeler-tips or contact-points of two forms. One thereof, marked $h$, (shown separately in Fig. 16,) has a wedge-shaped engaging extremity, with a comparatively blunt vertical edge for contact with the wound mass of weft or filling contained within the shuttle 6. This form is given the said shape in order that when the said edge contacts with a mass of weft or filling of any thickness it may indent the exterior of such mass slightly. The other thereof, marked $i$, (shown in Figs. 22 and 23) has a transversely broadened rear extremity that is formed with teeth having vertical edges or shoulders, the back of the inner tooth being narrow transversely, and preferably somewhat rounded, as shown, so as to make in effect a kind of heel. The projecting portions of the teeth of this form of feeler-tip or contact-point are intended to press more or less into the coils of the mass of filling which is carried against them, so that the shoulders of the teeth may engage with adjacent coils to prevent outward lateral displacement of the tip or contact-point so long as the said mass of weft or filling is sufficiently thick and yielding to permit the teeth to sink into the same. However, when the mass of weft or filling has become substantially exhausted so that when the feeling contact takes place the coils alongside the tooth or teeth of the acting extremity of the feeler-tip or contact-point do not stand out sufficiently to hold the said tooth or teeth from outward displacement, said displacement will take place, so that the feeler-member will swing around its pivot 13 upon the carrier 8, and the actuator that is combined with the feeler-member will be placed thereby in position to engage and actuate the controller 18 as the carrier 8 goes forward.

The material of which the feeler-tips or contact-points are made may vary in practice. In some cases they have been made of metal. Metal, however, has more or less tendency to wear and abrade or cut the coils of weft or filling, especially after repeated contact, and particularly when the coils are subjected to repeated contact between the feeler-tip or contact-point and a metal shuttle-spindle, as in the case of cop-filling. I have found that improved results may be attained through the employment of non-metallic material. The best results have been attained through the employment of so-called "fiber," of which vulcanized fiber is an instance. This particular material, after much research, has been found to possess a critical degree of resilience and slipperiness, which even under very considerable pressure of the impact under which the feeler operates, refuses to injure fine yarns or indent or injure the surface of enameled bobbins, preferring to slip thereon or on the yarn. The first form, $h$, of feeler-tip or contact-point is in the shape of a rod of small diameter having its rear end beveled and tapered, as already explained. It may be of any approved shape in cross-section, but it is convenient to have its stem cylindrical. The second form of feeler, $i$, is made with a rod-like stem, which conveniently is or may be cylindrical in cross-section, although in the case of this form the cross-sectional dimensions of its toothed rear-end portion may exceed those of the stem, as shown. In this form the contact tip has projecting heel and toe portions, as indicated in Fig. 22, giving it a serrated contact surface.

To obviate necessity for entrance of the body-portion of the feeler-member $a$ into the slots 2 and 5 of the front wall 3 of the shuttle-box and the front wall of the shuttle-body, the portion of the feeler-tip or contact-point projecting at the rear of the body of the feeler-member is made of sufficient length to project through the said slots and into contact at its extremity with the barrel of a bobbin, or with the shuttle-spindle in case of the use of cop-filling. In case of the employment of a front swell or binder in connection with the shuttle-box, such swell or binder will be slotted, as in the case of front-plate 3, and the feeler-tip or contact-point $h$ or $i$ will be long enough to extend through the slot. To obviate springing of the projecting portion of the feeler-tip or contact-point, and also guard against breakage thereof, I provide a holder which is adapted to constitute, also, a brace or reinforce for the feeler-tip or contact-point. This may have a variety of forms. The drawings illustrate braces or reinforces in the form of tubular sleeves $k$ and $k'$, shown separately in Figs. 17 and 18. The stems of the feeler-tips or contact-points are inclosed within these sleeves, which latter extend as close as may be found advisable to the acting extremities of the feeler-tips or contact-points. These braces or reinforces are in each instance carried by the feeler-member $a$. The drawings show sleeve-like braces or reinforces that are of proper shape in cross-section (cylindrical in the present instances) to fit the cylindrical stems of the feeler-tips or contact-points. The brace or reinforce marked $k$ is slitted throughout its length, as at $l$, to render it expansible and compressible. Its expansibility enables it to receive a feeler-tip stem that is slightly larger in diameter than its own normal internal diameter, and its compressibility enables it to be compressed upon a stem which fits loosely within it. The modified form of brace or reinforce $k'$ is slitted longitudinally at $l'$ only throughout the greater portion of its length, namely the portion which is entered within the socket of the feeler-member, the rearmost portion of the brace or reinforce being left unslitted.

For the convenient mounting of the feeler-tip or contact-point in connection with the feeler-member, I form the feeler-member $a$ with a split socket to receive the stem of the feeler-tip or contact-point, or the said stem and the inclosing brace or reinforce in case the latter is employed, the said split socket being furnished with a screw $n$ by which its side-portions may be drawn together to clamp the stem of the feeler-tip or contact-point, or the brace or reinforce and said stem, between them. This construction provides for compressing the split brace or reinforce tightly and snugly upon the stem of the feeler-tip or contact-point, so as to hold both the brace or reinforce and the feeler-tip or contact-point in place in connection with the feeler-member $a$ and in the desired working relation with each other. It provides, also, for the convenient application or removal of the feeler-tip or contact-point, or of the said tip or point and said brace or reinforce, and provides also for adjustment of the feeler-tip or the brace or reinforce in the direction of the length thereof relatively to the feeler-member $a$, as well as for independent adjustment of the feeler-tip and brace or reinforce, respectively.

In order to reduce the cost of manufacture I preferably make the feeler-member $a$, or more properly the body-portion thereof, by casting the same. The actuator $f$ which engages with the controller for the actuation of the latter I preferably make of harder material, as for instance hardened steel, in order that the portion thereof which acts upon the controller may not wear rapidly. To this end, therefore, I provide for the attachment of a separately formed actuator-piece to the body-portion of the feeler-member. I have here shown an actuator-piece or actuator having a head of suitable shape for engagement with the controller and a stem $f'$ projecting therefrom, and the forwardly extending arm $a^2$ of the feeler-member is bored to receive the said stem and provided with a clamping screw $a^3$, the threaded stem of which occupies a threaded hole $a^4$, Figs. 11 and 12, tapped in said arm, and engages by its inner end with the said stem $f'$ to hold the actuator in place. In other words I furnish the actuator with a stem and provide the body of the feeler-member with a socket which receives the said stem, and with means to clamp the stem in the said socket. The construction as shown herein provides for adjustment of the actuator in the direction of the length of its stem by setting the said stem farther in or out of the said socket. I employ the same construction in the case of the portion of the controller which is engaged by the actuator. That is to say, I furnish the controller with an engaging portion $18^a$ made of steel, having a head shaped properly to be engaged by the actuator and also having a stem, the controller having a socket which receives the said stem, and a clamping screw $18^b$ which binds against the said stem to make the engaging portion fast in place. This construction provides for adjustment of the engaging portion $18^a$ of the controller transversely with relation to the path of the actuator in the movement of the feeler and feeler-carrier forward under the pressure that is applied to the acting extremity of the feeler. The actuator $f$ and engaging portion $18^a$ of the controller may advantageously be produced by taking short lengths of rod square in cross-section, and turning portions of such lengths down to produce the stems.

I provide for adjustment of the actuator angularly relative to the pivotal axis about which the feeler-member turns upon the feeler-carrier 8. This adjustment may be attained in several different ways. In the first way shown in the drawings the feeler-member is made in two parts which are secured together with capacity for relative angular shift or adjustment to secure the adjustment of the actuator that has just been mentioned. Thus the body of the feeler-member, and its forwardly extending arm $a^2$ carrying the actuator $f$, are made as separate pieces, the said body being formed with a hole $a^5$ for the reception of the pivotal pin 13, and with an upwardly extending hub $a^6$ around the said hole $a^5$, and the said arm having an eye $a^7$, Fig. 11, which fits upon the said hub as shown in the plan views. a clamping screw $a^8$ being applied to a threaded hole $a^9$, Fig. 11, that is tapped in the eye-portion of the arm, and being arranged to engage by its inner end against the exterior of the hub to secure the parts together in the required angular relationship. This construction permits the arm to be set at any required angle with respect to the body-portion. The construction of the parts providing for adjustably connecting them together may be varied. The actuator may be adjustably mounted upon and secured in place upon the forwardly projecting arm of the feeler-member, or even upon the body-portion of the said feeler-member. One mode of carrying this idea into effect is shown in Fig. 24, and consists in connecting the actuator $f^{10}$ with the top of the forwardly-projecting arm of the feeler-member by means of a screw $f^{11}$ serving both as a pivot and as a means of clamping the actuator in place. This permits the free or engaging end of the actuator to be set in proper relation transversely to the portion of the controller with which it is intended to engage. Another way of securing the same end is shown in Figs. 25 and 26. It consists in forming the actuator, $f^{12}$, as a bar or block and providing a transverse groove in the forwardly-projecting arm of the feeler-member for its reception. The walls of the groove serve to confine the actuator between them, but leave it capable of being shifted transversely of the said arm. The actuator is fastened to the arm by means of a clamping screw, $f^{13}$, the stem of which passes through a slot $f^{14}$ in the actuator, the length of the said slot being extended transversely to permit of the said adjustment.

In practice it is desirable to have provisions for adjusting the tension of the feeler-member, and to this end I provide means for adjusting the tension of the feeler-member spring. The spring $c$ shown in the drawings is composed of a straight length of spring material, shown as a wire, although a blade-spring might be employed. One end of the spring is engaged with the feeler-member, and the other is made fast by means of a clamping-screw $c'$ in a suitable socket that is provided in connection with a forward extension of the carrier or carrier-member. The adjustment-provisions comprise a screw $c^2$, shown separately in Fig. 19, working transversely in a threaded hole that is tapped through the said extension of the carrier or carrier-member. The outer end of the said screw is in operative engagement with the spring so as to control the latter, and by adjustment of the screw the spring may be flexed to the extent required for opposing the proper degree of resistance to the turning of the feeler-member on its pivot under the push of the wound supply of weft or filling thereagainst.

The adjustment screw $c^2$ is provided with a check-nut $c^3$ to prevent accidental loss of adjustment. The said screw may engage directly with the spring $c$, but preferably I provide the acting end of the said screw with a loose cap $c^4$, (shown separately in Figs. 20 and 21,) which fits upon the said end and intervenes between such end and the spring. This cap is grooved transversely in its outer face, as at $c^5$, to receive the spring $c$, so that by means of the walls of the said groove the spring is prevented from slipping off from the cap. When the screw is turned for purposes of adjustment, its end turns within the cap, which is held from turning through the engagement of the spring in the groove. In case the tension screw is employed without the loose cap the acting end of the said screw is notched to receive the stem of the tension spring. Either a single groove or notch may be provided in the said end of the said screw, in which case the adjustment will necessarily involve turning the said screw so as to place the said notch or groove in line with and in position to receive the stem of the spring; or the end of the screw may be provided with notches or grooves crossing the same at right angles, in which case a finer adjustment of the tension of the spring will be possible, inasmuch as in turning the screw the adjustment may be graduated to the extent of a quarter turn. In other words, the screw will lock at quarter turns instead of half turns as in the case of the single groove or notch. When the spring engages directly with the notched end of the screw, the lock-nut $c^3$ may be omitted.

Through adjustment of the tension of the feeler-member the readiness with which the latter yields so as to become displaced laterally may be regulated for the purpose of securing the desired action in practice, and determining the extent of exhaustion of the weft or filling at which the feeler-motion shall indicate. The higher the tension, the closer will be the approach to complete exhaustion, and vice versa. With the same general purpose in view, I make provision for varying the extent to which the acting extremity of the actuator is offset laterally with respect to the line from front to rear passing through the pivotal axis of the feeler-member. It will be obvious that the greater the extent of the lateral offsetting the more advantageous the leverage will be, and the more readily will the feeler-member tend to displace laterally relative to the carrier-member or carrier. The contrary will be the case the less the extent of the lateral offsetting. These last mentioned provisions comprise the adjustable stop-screw $d$, it having its threaded stem fitted to a threaded hole that is tapped through an upstanding lug $8^e$ of the carrier-member, the inner end of the said stem being disposed in position to engage with the forwardly extending arm $a^2$ of the feeler-member as the latter is turned upon its pivot through the action of the spring. By adjustment of this screw the extent to which the feeler-member is caused to turn around its pivot under the action of the spring may be varied as required, and thereby the extent to which the acting extremity of the actuator is offset when in its normal position may be varied as may be required in order to secure the desired results in operation. A lock-nut $d'$ upon this adjusting stop-screw serves to prevent accidental loss of adjustment.

To limit the extent of the lateral swinging displacement of the feeler-member, the second stop-screw $e$ is applied to the same upstanding lug of the carrier-member, with its rear end in proximity to the laterally extending portion of the body of the feeler-member. As the feeler-tip or contact-point displaces transversely outward the resulting swinging movement of the feeler-member carries the outwardly extending portion of the feeler-member into contact with the said stop-screw, which therefore restricts the extent of the said relative turning movement. This stop-screw is provided with a lock-nut $e'$ to prevent accidental loss of adjustment.

The buffer which serves as a cushioning stop for the forward stroke of the feeler-carrier consists of a pad $p$ of suitable cushioning material that is fastened by means of one or more screws $p'$ and washers $p^2$ to the upright portion or arm of the feeler-stand 10, in position to be encountered by the outer arm of the feeler-carrier 8 at the end of the forward stroke produced as a result of the mass of filling in the shuttle being carried against the feeler-tip or contact-point in the beating-up movement of the lay. Preferably, this cushion is so located as to arrest the overthrow of the feeler-carrier due to the momentum derived from the forward push that is transmitted to it. In other words, the cushion is located a trifle clear of the position that would be reached by the feeler-carrier in its forward stroke but for the overthrow.

For the purpose of latching the feeler-devices out of operation when required, I provide a hole $r$ in the top of the front of the feeler-stand 10, and a corresponding hole $r'$ in the feeler-carrier in a position to cause the two holes to register when the feeler-carrier is moved forward against the cushion or close to the cushion. When it is desired to lock the feeler-carrier forward, I push a locking pin into the registering holes, and by means of the said pin, the feeler-carrier is held locked in a forwardly retracted position, motionless and out of action, because the feeler-point or contact-point is held forward out of position to be engaged by the filling upon the filling-carrier. A suitable locking pin is represented at $s$ in Fig. 27. Other forms of latching or locking means may be employed for the purpose.

Fig. 28 illustrates the second form of embodiment, in which the carrier $8^m$ for the feeler-member is mounted to slide in a straight line in the guide $8^n$, it being held normally in its rearward position by the tension of an expanding spiral spring $8^o$ surrounding its stem $8^p$. In this form of embodiment I employ a tension-spring $c^{12}$ constituted by a contracting spiral spring having one end thereof connected with a pin projecting from the forwardly-extending arm of the feeler-member $a$, and its other extremity connected with a screw $c^{13}$ applied to an upstanding lug of an outwardly projecting portion of the carrier $8^m$. The threaded stem of the said screw has adjusting nuts $c^{14}$, $c^{14}$, applied to the same at opposite sides of the said lug, by means of which the screw may be shifted endwise to vary the tension of the spring as may be required in order to secure the required delicacy of action in the case of the feeler-member.

Referring now more particularly to the devices which are controlled by controller 18, and which serve more immediately in calling the required change in the operation of the loom, these are shown in detail in Figs. 4 to 8. The dog 22 is as heretofore overweighted at the front of its pivot 23 so that the forward arm of the said dog normally remains down with its laterally projecting pin $22^e$ resting upon the top of the supporting-arm 24 and the engaging shoulder $22^a$ of its rear arm held above and clear of the path of the striker 28 carried by weft-hammer 29. As, heretofore, also, when the controller 18 is swung around its pivot 19 in consequence of the action of the actuator $f$ of the feeler-member $a$ against the outer end $18^a$ of the controller, the inwardly-projecting arm of the controller passes rearward over and in contact with the cam-incline $22^b$ on the top of the rear arm of the dog. The pressure of the rearwardly-moving arm of the controller against the said cam-incline tilts the dog and depresses the shoulder $22^a$ of the dog into the path of the striker 28, which thereupon in its forward stroke acts to move the dog forward for indicating purposes. By way of illustration, I have shown the parts combined to stop the loom by releasing the shipper-handle when the feeler acts to bring about the forward movement of the dog. To this end, the supporting-arm 24 for this dog has a downward lug or projection $24^a$ located at the rear of the knocking-off lever 40. Consequently, when the dog and supporting-arm are moved forward, the lug or projection $24^a$ causes the lever 40 to swing forward around its pivot 41, and to dislodge the shipper-handle 42 from the retaining notch therefor in the slot 43 in which the shipper-handle works. As illustrated, the knocking-off lever 40 is arranged to be operated also by the weft-fork slide 27 when the latter is moved forward on detection of weft-absence, in order to bring about unshipping and stoppage of the loom because of such absence. Heretofore in some cases, the dog has been pivoted upon the knocking-off lever, and where that has been the fact is has been observed that the forward stroke of the weft-hammer as it engaged with the tail of the weft-fork operated to carry the striker 28 in under the rear arm of the dog before the weft-fork slide began to move the knocking-off lever forward. Then the forward movement of such lever operated to carry the dog forward under the controller 18. As this movement proceeded, the forward passage of the cam-shaped portion of the dog beneath the controller first caused the rear arm to take bearing upon the top of the striker, and then operated to force the controller upward, thereby straining the controller and its pivotal mounting. To obviate this, I mount the dog upon the arm 24, independently of the knocking-off lever, and provide such arm with the depending lug to actuate the knocking-off lever when the arm is pushed forward. Consequently, the knocking off lever may be moved forward through the forward movement of the weft-fork slide without occasioning forward movement of the dog, and the undesirable action above described is obviated. I gain also an advantage in being able to set the striker and the shoulder 22$^a$ in closer relations with each other, insuring greater certainty in respect of the engagement of the striker with the shoulder as the striker moves forward. To prevent the controller from passing entirely off from the rear arm of the dog, as a result of overthrow when the controller is actuated by the actuator, I furnish the said arm at the rear of the cam-incline 22$^b$ with an upstanding stop-projection 22$^m$, which limits the extent of the rearward movement of the inwardly-extending arm of the controller.

In the present construction, the arm 24 is mounted loosely upon the supporting shaft 25, or it might be upon a simple stud. To hold the said arm normally in its rearward position, with its upstanding portion resting against the front of the breast-beam 11, the said arm is furnished with a counter-weight 24$^m$. When it is desired to utilize the movement of the arm forward under the control of the feeler-motion to control the weft-replenishing instrumentalities the said arm may be made fast by a set-screw to the shaft upon which it is mounted, and the latter will be combined operatively with the replenishing instrumentalities. The weft-fork slide is shown engaged with the arm 30 fast upon shaft 31. The latter, in practice, has combined with it devices for arresting the taking-up action and letting-back, as customary in connection with weft-stop mechanism in looms.

I claim as my invention:

1. The combination with a movable feeler-carrier, a laterally-movable feeler mounted thereon adapted to be displaced laterally by pressure of a substantially-denuded weft or filling carrier against the feeler-tip, and a projecting feeler-tip, of a tubular compressible brace or reinforce for said feeler-tip carried by the feeler carrier and extending toward the acting end of the feeler-tip.

2. The combination with a movable feeler-carrier, a laterally-movable feeler mounted thereon adapted to be displaced laterally by pressure of a substantially-denuded weft or filling carrier against the feeler-tip, and a projecting feeler-tip, of a brace or reinforce for said feeler-tip, constituted by a split holder therefor, receiving within it the stem of the feeler-tip, and carried by the feeler-carrier.

3. The combination with a feeler-tip having a stem, and a split brace or reinforce surrounding said stem, of a feeler-member having a split socket within which the split brace or reinforce and stem are held by the closing of the split socket upon them.

4. In a feeler-motion, in combination, a controller, a movable carrier, a feeler-member mounted on said carrier and adapted to be displaced laterally by contact-pressure, said feeler-member having an angularly-adjustable arm, and a controller-actuator longitudinally adjustable upon said arm.

5. In a feeler-motion, in combination, a controller, a movable carrier, a feeler-member mounted on said carrier and adapted to be displaced laterally by contact-pressure, said feeler-member having an angularly-adjustable arm having an actuator-socket, and a controller-actuator having a stem occupying said socket and longitudinally adjustable relative to the arm.

6. In a feeler-motion, the combination with a movable carrier, and a feeler-member and an actuator operatively combined with each other and mounted on said carrier, of a controller and a separately formed engaging member combined with the controller and adapted for coöperation with said actuator, the said member being made of hard wear-resisting material and adjustable on the controller relatively to the actuator.

7. In a feeler-motion, in combination, a movable carrier, a feeler-member mounted on said carrier with capacity for lateral displacement, an actuator combined with said feeler-member with capacity for adjustment both laterally and longitudinally, a controller, and an actuator-engaging member combined with the controller with capacity for adjustment longitudinally.

8. In a feeler-motion, in combination, a movable carrier, a feeler-member mounted thereon having a laterally adjustable arm having a socket, an actuator mounted in said socket in the laterally adjustable arm and itself adjustable longitudinally, a controller having a socket, and an actuator-engaging member mounted in said socket and adjustable longitudinally.

9. In a feeler-motion, the combination with a carrier, a laterally-displaceable feeler-member mounted thereon, and a flexure-spring acting upon the feeler-member to hold the same normally and yieldingly in a definite position, of means for adjusting said tension at will by flexing the spring more or less.

10. In a feeler-motion, the combination with a carrier, and a laterally-displaceable feeler-member mounted thereon, of a straight spring engaging with the said feeler-member to hold the same normally and yieldingly in a definite position, and adjusting means for bending the said spring more or less and thereby varying its tensions and that of the feeler-member.

11. In a feeler-motion, the combination with the carrier, and a laterally-displaceable feeler-member mounted thereon, of a straight spring engaging with the said feeler-member, a non-rotating cap engaging with the spring, and an adjusting screw operatively combined with said cap and by means of which the spring may be bowed more or less to adjust the tension of the spring and of the feeler-member.

12. In a loom, in combination, a weft-hammer provided with a striker, a weft-fork, a weft-fork slide, a knocking-off lever adapted to be operated by movement of said slide, an overweighted catch having a cam-formation, feeler-devices having a controller that extends into position for coöperation with said cam-formation and by action upon the cam-formation places the catch in the path of the striker, and a separate support for said catch operatively combined with the means for calling a change in the operation of the loom.

13. In a loom, in combination, means for calling a change including a pivotally mounted catch provided with a stop thereon, and feeler-devices including a controller-actuator and a controller, the said stop adapted to limit the extent of the movement of the controller that is produced by the actuator, to thereby prevent the controller from passing entirely off from the catch.

14. A side-slipping feeler member of the kind which slips sidewise on the denuded or partially denuded filling carrier when it calls the change, and provided with a contact tip made of vulcanized fiber, said tip receiving the whole impact of the filling or filling-carrier and adapted to slip while enduring the impact pressure.

15. A side-slipping feeler member having a contact tip of vulcanized fiber and a pivotal mounting having its axis offset from the direction of push of the filling or filling-carrier on said tip, said member being organized to receive the whole impact of said filling or filling-carrier against said fiber tip and to call the change by virtue of the slipping of the said tip thereon.

16. In a feeler motion, a side-slipping feeler member having a contact tip formed with projecting yarn penetrating portions and pivotally mounted on a carrier on an axis offset from the line of push on said tip, and means for adjustably varying the extent of said offset.

17. In a feeler motion, a feeler-carrier, a feeler having a contact tip of vulcanized fiber engaged by the filling and pivoted on the carrier on an axis offset from the line of push on said tip, a spring for determining the position of said tip when receiving the push, and means for changing said position.

In testimony whereof I affix my signature in presence of two witnesses.

HENRY A. OWEN.

Witnesses:
NATHAN B. DAY,
CHAS. F. RANDALL.